US005409032A

United States Patent [19]

Berfield

[11] Patent Number: 5,409,032

[45] Date of Patent: Apr. 25, 1995

[54] PRESSURE WASHER BYPASS VALVE

[75] Inventor: Robert C. Berfield, Jersey Shore, Pa.

[73] Assignee: Shop Vac Corporation, Williamsport, Pa.

[21] Appl. No.: 216,143

[22] Filed: Mar. 21, 1994

Related U.S. Application Data

[63] Continuation-in-part of Ser. No. 75,414, Jun. 14, 1993, abandoned, which is a continuation-in-part of Ser. No. 819,351, Jan. 15, 1992, Pat. No. 5,259,556, which is a continuation-in-part of Ser. No. 634,063, Dec. 26, 1990, Pat. No. 5,086,975, which is a continuation of Ser. No. 462,733, Jan. 19, 1990, abandoned, which is a continuation-in-part of Ser. No. 297,620, Jan. 17, 1989, abandoned.

[51] Int. Cl.[6] .................... G05D 7/01

[52] U.S. Cl. .................... 137/117; 239/126; 417/299

[58] Field of Search .................... 137/117, 119; 417/299; 239/126

[56] References Cited

U.S. PATENT DOCUMENTS

| | | | |
|---|---|---|---|
| 373,072 | 11/1887 | Jarvis | 92/167 |
| 2,018,119 | 10/1935 | Brouse | 103/42 |
| 2,969,951 | 1/1961 | Walton | 251/332 |
| 3,246,845 | 4/1966 | Techler et al. | 239/71 |
| 3,358,705 | 12/1967 | Krechel | 137/119 X |
| 3,429,508 | 2/1969 | Russinik | 239/126 |
| 3,524,465 | 8/1970 | Sadler | 137/115 |
| 3,529,626 | 9/1970 | German | 137/563 |
| 3,606,904 | 9/1971 | Taylor | 137/102 |
| 3,707,981 | 1/1973 | Sadler | 137/119 X |
| 3,796,228 | 3/1974 | Bedo et al. | 137/536 |
| 3,827,827 | 8/1974 | Hill | 417/28 |
| 3,855,906 | 12/1974 | Mohrenstein-Ertel et al. | 92/153 |
| 4,084,609 | 4/1978 | Johnson | 137/327 |
| 4,172,468 | 10/1979 | Ruus | 137/504 |
| 4,182,354 | 1/1980 | Bergstedt | 137/10 |
| 4,277,229 | 1/1980 | Pacht | 417/454 |
| 4,324,407 | 4/1982 | Upham et al. | 277/27 |
| 4,385,640 | 5/1983 | Iverson | 137/117 |
| 4,467,703 | 8/1984 | Redwin et al. | 92/128 |
| 4,470,428 | 9/1984 | Bishop | 417/299 X |
| 4,497,440 | 2/1985 | Galloway | 239/201 |
| 4,611,628 | 9/1986 | Pasternack | 137/509 |
| 4,638,831 | 1/1987 | Lindgren | 417/299 X |
| 4,644,972 | 2/1987 | Perrott | 137/883 |
| 4,653,339 | 3/1987 | Komatsu et al. | 74/422 |
| 4,687,022 | 8/1987 | Iverson | 137/531 |
| 4,758,135 | 7/1988 | Woodward et al. | 417/559 |
| 4,860,995 | 8/1989 | Robers | 251/356 |
| 4,897,996 | 2/1990 | Hagin et al. | 60/468 |
| 4,941,502 | 7/1990 | Loos et al. | 137/116 |
| 4,951,713 | 8/1990 | Jordan et al. | 137/895 |
| 5,067,654 | 11/1991 | Paige | 239/124 |
| 5,086,975 | 2/1992 | Paige | 239/124 |
| 5,230,471 | 7/1993 | Berfield | 239/124 |

FOREIGN PATENT DOCUMENTS

| | | | |
|---|---|---|---|
| WO88/01912 | 3/1988 | Denmark . | |
| 0207501 | 1/1987 | European Pat. Off. . | |
| 3047493 | 7/1982 | Germany . | |

*Primary Examiner*—Robert G. Nilson

*Attorney, Agent, or Firm*—Marshall, O'Toole, Gerstein, Murray & Borun

[57] ABSTRACT

An improved fluid bypass valve includes a valve housing having an inlet port, an outlet port and a bypass port, all of which are in fluid communication with a valve chamber within the valve housing. A shuttle having a fluid passage therein is disposed within the valve chamber and moves between a first travel limit position, in which fluid communication between the fluid passage and the bypass port is blocked and a second travel limit position, in which such fluid communication is permitted. First and second fluid seals are disposed in contact with interior surfaces of the valve housing on opposite sides of the bypass port, and the shuttle is disposed in sealing and sliding engagement with both the first and second fluid seals when the shuttle is in the first and second travel limit positions.

23 Claims, 9 Drawing Sheets

PRESSURE WASHER BYPASS VALVE

CROSS REFERENCE TO RELATED APPLICATIONS

The present application comprises a continuation-in-part of U.S. application Ser. No. 08/075,414, filed Jun. 14, 1993, now abandoned which is in turn a continuation-in-part of U.S. application Ser. No. 07/819,351 filed Jan. 15, 1992 (now U.S. Pat. No. 5,259,556), which is a continuation-in-part of U.S. application Ser. No. 07/634,063, filed Dec. 26, 1990 (now U.S. Pat. No. 5,086,975), which is a continuation of U.S. application Ser. No. 07/462,733, filed Jan. 19, 1990, now abandoned, which is a continuation-in-part of U.S. application Ser. No. 07/297,620, filed Jan. 17, 1989, now abandoned.

TECHNICAL FIELD

The present invention relates generally to pump structures, and more particularly to a bypass valve for a fluid pump such as is used, for example, in a pressure washer.

BACKGROUND ART

Pressure washers have been designed wherein a pump pressurizes a fluid which is ejected as a stream or spray out of a nozzle. In a floor-standing pressure washer, the pump is disposed in a floor standing unit to which a spray gun is connected by a hose and flow is controlled by a flow control valve disposed in the spray gun. In a hand-held pressure washer, a pump and valve are incorporated in a spray gun, which is connected to a fluid source by a hose. The flow of pressurized fluid out of the nozzle is selectively controlled by turning the pump on or off by means of a switch carried by the gun.

In the floor-standing embodiment, the pump operates continuously because no means for activating and deactivating the pump is integrated into the spray gun.

In either version of the pressure washer, it is desirable to provide a bypass valve which recirculates fluid flowing out of the pump back to the intake of the pump when the fluid is prevented from flowing out of the pressure washer through the spray nozzle, for example, when a blockage occurs in the fluid flow path. In addition, in at least the floor-standing embodiment, a limited flow of fluid out of the nozzle may be permitted so that the pump may be cooled by fresh (i.e., nonrecirculated) fluid. In this way, the pump can operate continuously without being subjected to undue stress and premature failure.

The pressure washer disclosed in Paige, et al., parent application Ser. No. 07/819,351, now U.S. Pat. No. 5,259,556, includes a bypass valve (hereinafter the "prior valve") in which a shuttle is moveable in a bypass chamber between a first position, in which the shuttle blocks the flow of fluid from the bypass chamber into a bypass conduit, and a second position, in which the shuttle permits such flow when fluid flow out of the valve is blocked. Paige, et al. '556 also discloses means for biasing the shuttle toward the second position to permit fluid to flow from the bypass chamber into the bypass conduit.

In the prior valve, a pair of fluid seals are carried by and circumferentially surround the shuttle. The seals are disposed in contact with the inner surfaces of the valve housing when the shuttle is in the first position to prevent flow of fluid out of the bypass chamber into the bypass conduit. When the shuttle moves to the second position to permit such flow, however, one of the fluid seals moves to a region of the valve housing having an inner diameter larger than the outer diameter of that seal. As a result, that seal moves out of contact with the inner surface of the valve housing, allowing debris to accumulate between the seal and the housing and permitting the seal to become misshapen. Thereafter, the debris or the seal itself may prevent the shuttle from being moved to the first position so that the bypass function is impaired.

In addition, loss of sealing contact results in a loss of the pressure-force differential that is used to move the shuttle to the rear position. Still further, once the pressure-force differential is lost, the frictional engagement of the seals surrounding the shuttle is likewise substantially lost, thereby permitting the movement of the shuttle in response to relatively small forces. Thereafter, when partial flow of fluid out of the spray nozzle occurs, such as when limited fluid flow out of the nozzle is permitted for cooling purposes, the shuttle tends to oscillate or otherwise act in an indeterminate manner, thereby impairing the bypass function. While a spring may be added to bias the shuttle rearward and reduce this indeterminate behavior, it has been found that this undesired effect cannot be eliminated entirely in the prior valve.

SUMMARY OF THE INVENTION

The present invention comprises an improvement in a bypass valve for use with a fluid pump.

The bypass valve in which this improvement may be used includes a valve housing having a valve chamber inside the valve housing, an inlet port at an inlet end of the valve chamber, an outlet port at an outlet end of the valve chamber and a bypass port disposed between the inlet end and the outlet end. The inlet port, outlet port and bypass port are all in fluid communication with the valve chamber. A shuttle having a fluid passage therein is disposed in the valve chamber and can move between a first travel limit position, in which fluid communication between the fluid passage and the bypass port is blocked, and a second travel limit position, in which the fluid passage is in fluid communication with the bypass port. According to one aspect of the present invention, the improvement comprises first and second fluid seals carried by the interior surfaces of the valve housing on opposite sides of the bypass port. Surfaces on the shuttle are disposed in sealing and sliding engagement with both the first and second fluid seals and the inlet port and the outlet port are in fluid communication through the fluid passage when the shuttle is in the first and second travel limit positions.

Preferably, the shuttle also has a bypass orifice through which fluid may escape from the fluid passage and exit the valve housing through the bypass port when the shuttle is in the second travel limit position. Further in accordance with the preferred embodiment, the bypass orifice travels past the first fluid seal as the shuttle moves between the first and second travel limit positions and the bypass orifice has a cross-sectional size at an outer portion thereof which is larger than a cross-sectional size of the first fluid seal. Still further, the bypass orifice preferably includes a cylindrical portion at an inner portion thereof and a tapered portion at the outer portion thereof.

Also preferably, the bypass orifice is disposed between an end of the valve chamber and the first and second fluid seals when the shuttle is in the first travel limit position and is disposed between the first and second fluid seals when the shuttle is in the second travel limit position. The fluid passage through the shuttle may include a portion of reduced cross-sectional size in order to produce a pressure drop across the shuttle as fluid flows through the fluid passage.

The second fluid seal preferably abuts a metal backing ring which prevents extrusion of the second fluid seal. Also, the shuttle may include a first shouldered portion which engages a second shouldered portion on the valve housing when the shuttle is in the second travel limit position such that an end of the shuttle is spaced from a rear wall of the valve chamber. Still further, a spring may be placed in compression between an end wall of the valve chamber and the shuttle.

Also in accordance with the preferred embodiment, the shuttle has a first sealing surface having a first cross-sectional area and a second sealing surface having a second, larger cross-sectional area. When fluid is permitted to escape from the valve chamber through the outlet port, the fluid pressure at the inlet end of the valve chamber exceeds the pressure at the outlet end of the valve chamber and urges the shuttle into the first travel limit position. Further, when escape of fluid from the valve chamber through the outlet port is restricted or blocked, the pressure at the inlet end substantially equals the pressure at the outlet end so that a net force attributable to the pressures acting on the sealing surfaces urges the shuttle into the second travel limit position.

The shuttle may include a cylindrical shuttle body portion having the fluid passage therein and a hollow cylindrical shuttle collar that circumferentially surrounds the shuttle body portion. Further, the shuttle collar may include a bypass orifice and the shuttle body portion may include a series of apertures therethrough forming a screen in fluid communication with the bypass orifice.

According to another aspect, a bypass valve includes a valve housing having a valve chamber inside the valve housing, an inlet port at an inlet end of the valve chamber, an outlet port at an outlet end of the valve chamber and a bypass port disposed between the inlet end and the outlet end. The inlet port, outlet port and bypass port are all in fluid communication with the valve chamber. A shuttle having a fluid passage therein is disposed in the valve chamber and is movable between a first position, in which fluid communication between the fluid passage and the bypass port is blocked, and a second position, in which the fluid passage is in fluid communication with the bypass port. An improvement in the bypass valve comprises first and second fluid seals carried by the interior surfaces of the valve housing on opposite sides of the bypass port. Also, the shuttle further includes a first sealing surface having a first cross-sectional area and a second sealing surface having a second, larger cross-sectional area wherein the first and second sealing surfaces are disposed in sealing and sliding engagement with both the first and second fluid seals when the shuttle is in the first and second positions. Still further, the shuttle includes a cylindrical shuttle body portion having the fluid passage therein and a hollow cylindrical shuttle collar that circumferentially surrounds the shuttle body portion. When fluid is permitted to escape from the valve chamber through the outlet port, the pressure at the inlet end of the valve chamber exceeds the pressure at the outlet end of the valve chamber and urges the shuttle into the first position. When escape of fluid from the valve chamber through the outlet port is substantially reduced, the pressure at the inlet end substantially equals the pressure at the outlet end, and a net force attributable to the pressures acting on the first and second cross-sectional areas being sealed by the first and second fluid seals urges the shuttle into the second position. Also in accordance with this aspect, the shuttle collar includes a bypass orifice therein and the shuttle body portion further includes a series of apertures therethrough. The apertures form a screen which is in fluid communication with the bypass orifice and prevents debris in fluid flowing through the valve from clogging the bypass orifice. The bypass orifice cooperates with the screen to permit fluid to escape from the fluid passage to the bypass port when the shuttle is in the second position.

The apertures, bypass orifice or bypass port are sufficiently restrictive to develop pressure within the valve which causes a force differential to be maintained across the shuttle in the second position. Further, the maintenance of pressure within the valve and the maintenance of sealing contact between the shuttle and the valve housing causes the seals to remain frictionally engaged with the shuttle. These effects retain the shuttle in the second position, even under conditions of partial flow of fluid out of the spray nozzle.

DESCRIPTION OF THE PREFERRED EMBODIMENTS

Figure 1:
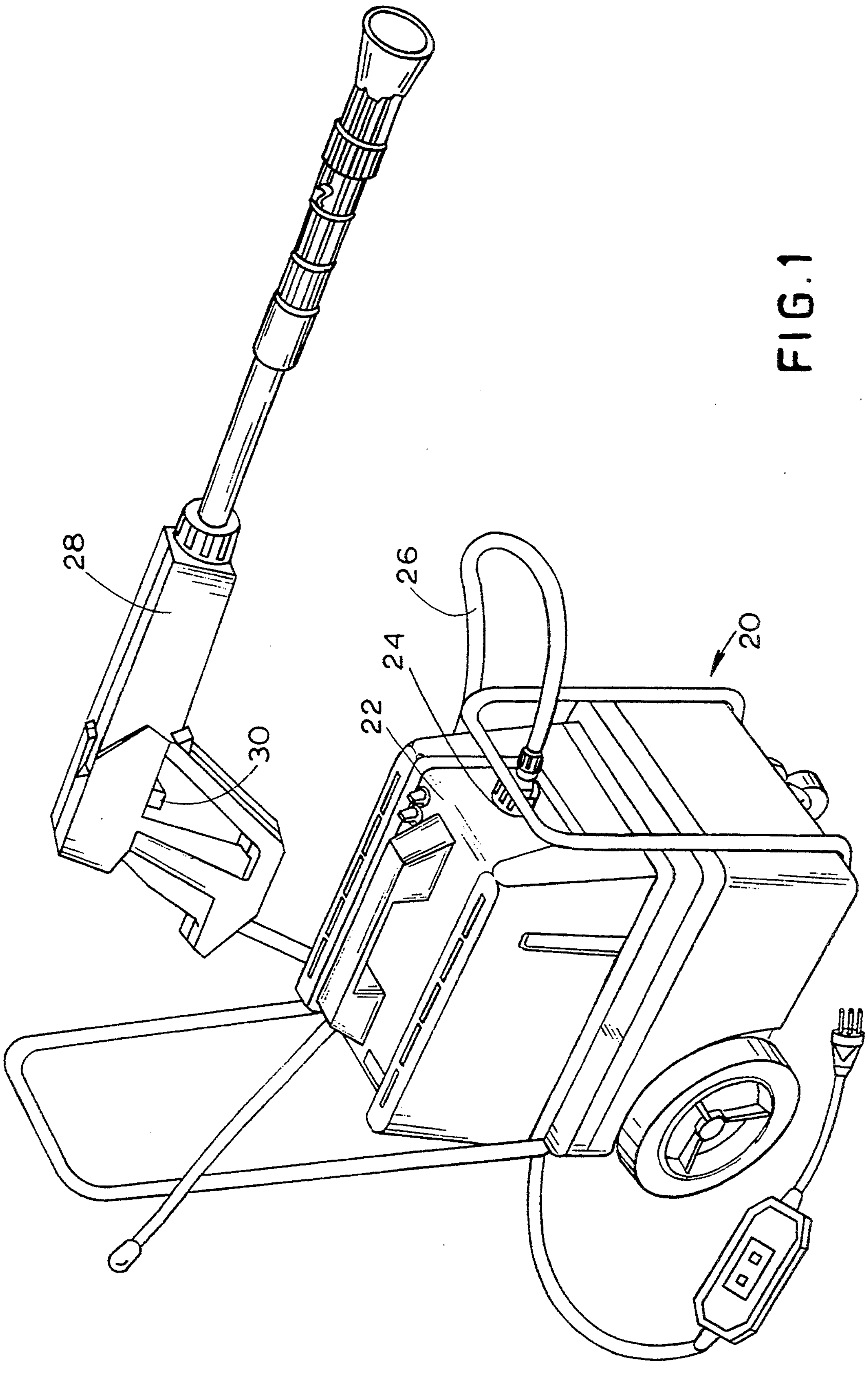
FIG. 1 is a perspective of a pressure washer in which the valve of the present invention may be used.

Referring to FIG. 1, a pressure washer 20 in which the present invention may be used comprises a base unit 22 for delivering fluid under pressure through a fluid outlet 24 and a hose 26 to a spray gun or wand 28.

Figure 2:
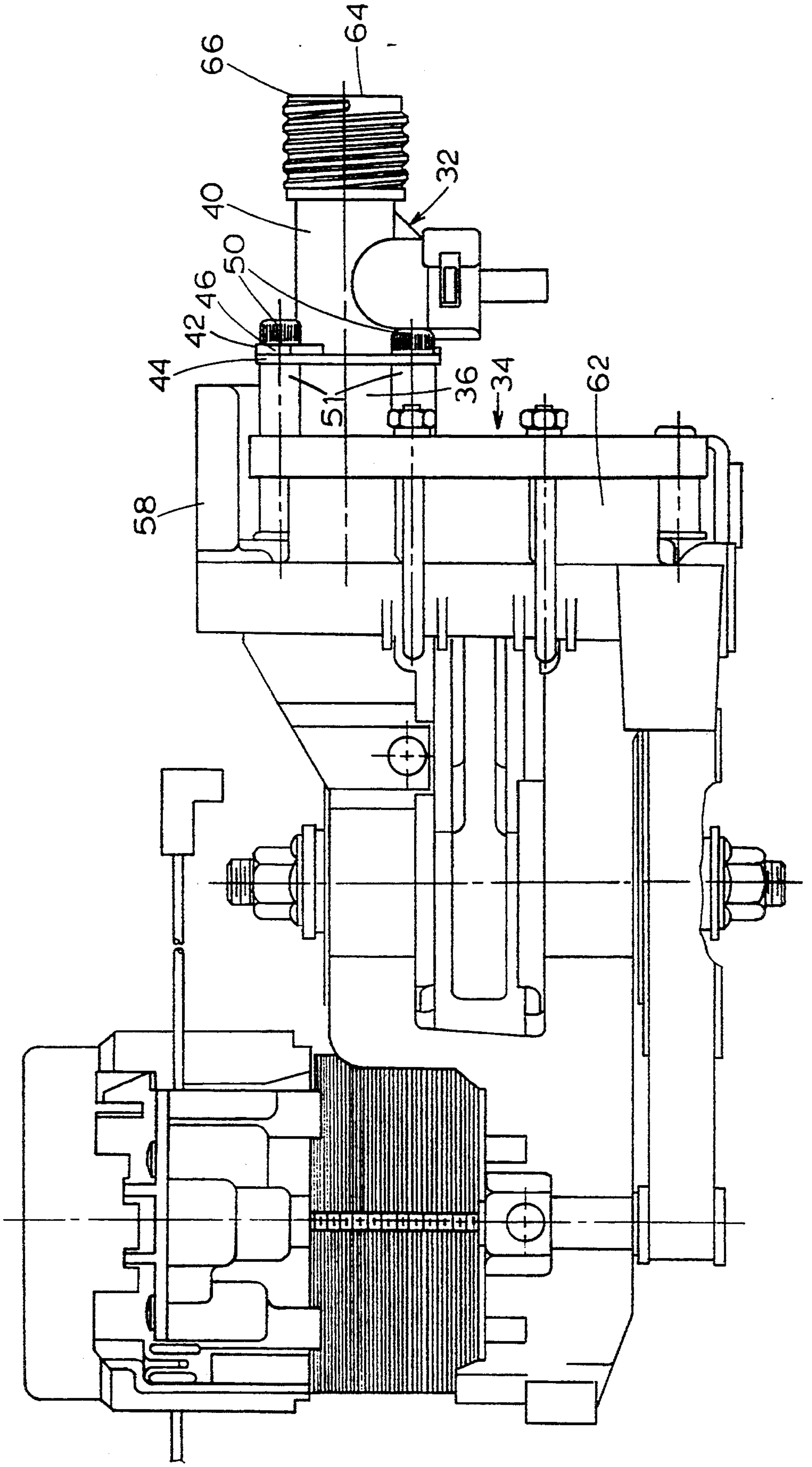
FIG. 2 is a side view of the bypass valve of the present invention connected to a pump.
Figure 3:
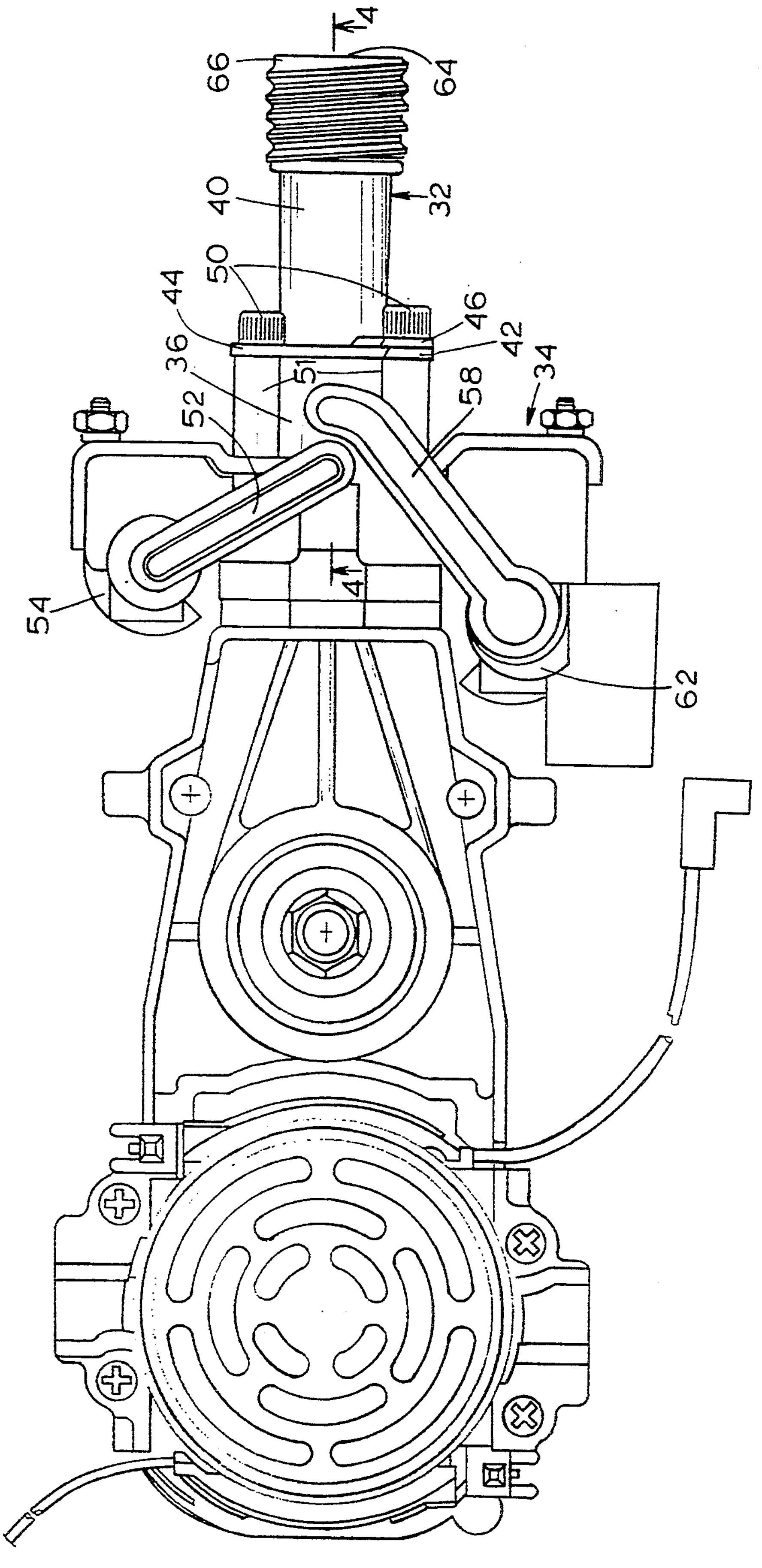
FIG. 3 is a plan view of the bypass valve and pump of FIG. 2.

Referring also to FIGS. 2 and 3, in a first embodiment, a pump 34 within the base unit 22 operates continuously to pump fluid to the spray gun 28. The spray gun 28 is provided with a trigger 30 which may be depressed to permit the flow of fluid at elevated pressure out of the spray gun 28. When the trigger 30 is not depressed, the flow of fluid out of the spray gun 28 is blocked.

If desired, the spray gun 28 may be configured to permit some fluid to escape therefrom even when the trigger 30 is released. This assists in cooling the pump 34 by introducing unheated fluid into the pressure washer 20. This, in turn, reduces the adverse thermal effect of recirculating fluid through the pump 34 which otherwise tends to heat the fluid as it recirculates because of friction in the pump 34. A bypass valve 32 according to the present invention is disposed within the base unit 22 and is mounted on the pump 34 in any suitable fashion. For example, with reference to FIGS. 4 and 5, the pump 34 includes a cylindrical receiving sleeve 36 that receives and circumferentially surrounds an inlet end 38 of a valve housing 40 (FIGS. 4 and 5).

Figures 4, 4A:
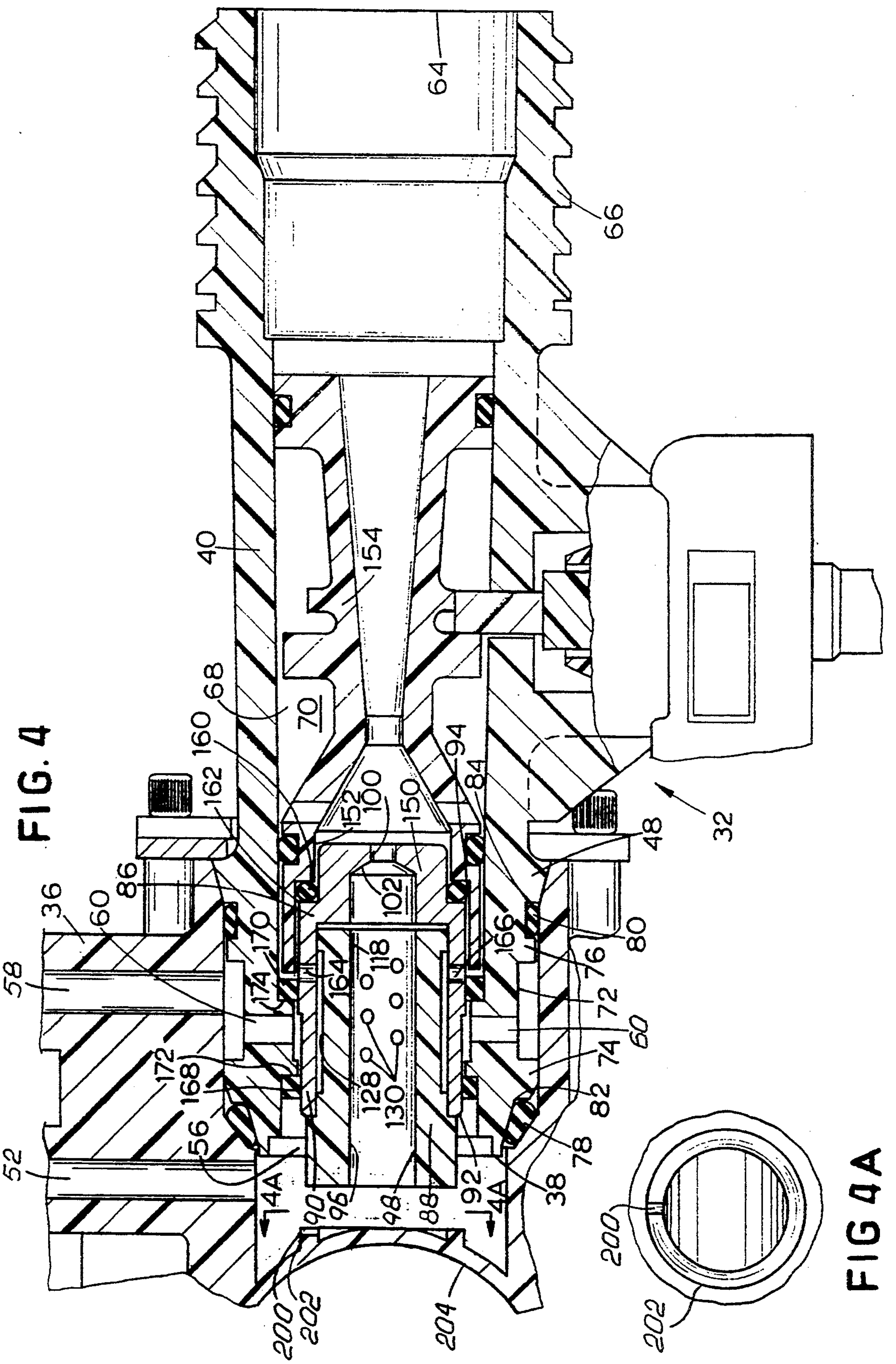
FIG. 4 is an enlarged partial sectional view of the bypass valve of the present invention with the shuttle shown in a first position.
FIG. 4A is a partial elevational view of the rear wall of the receiving sleeve, taken generally along the lines 4A—4A of FIG. 4.
Figure 5:
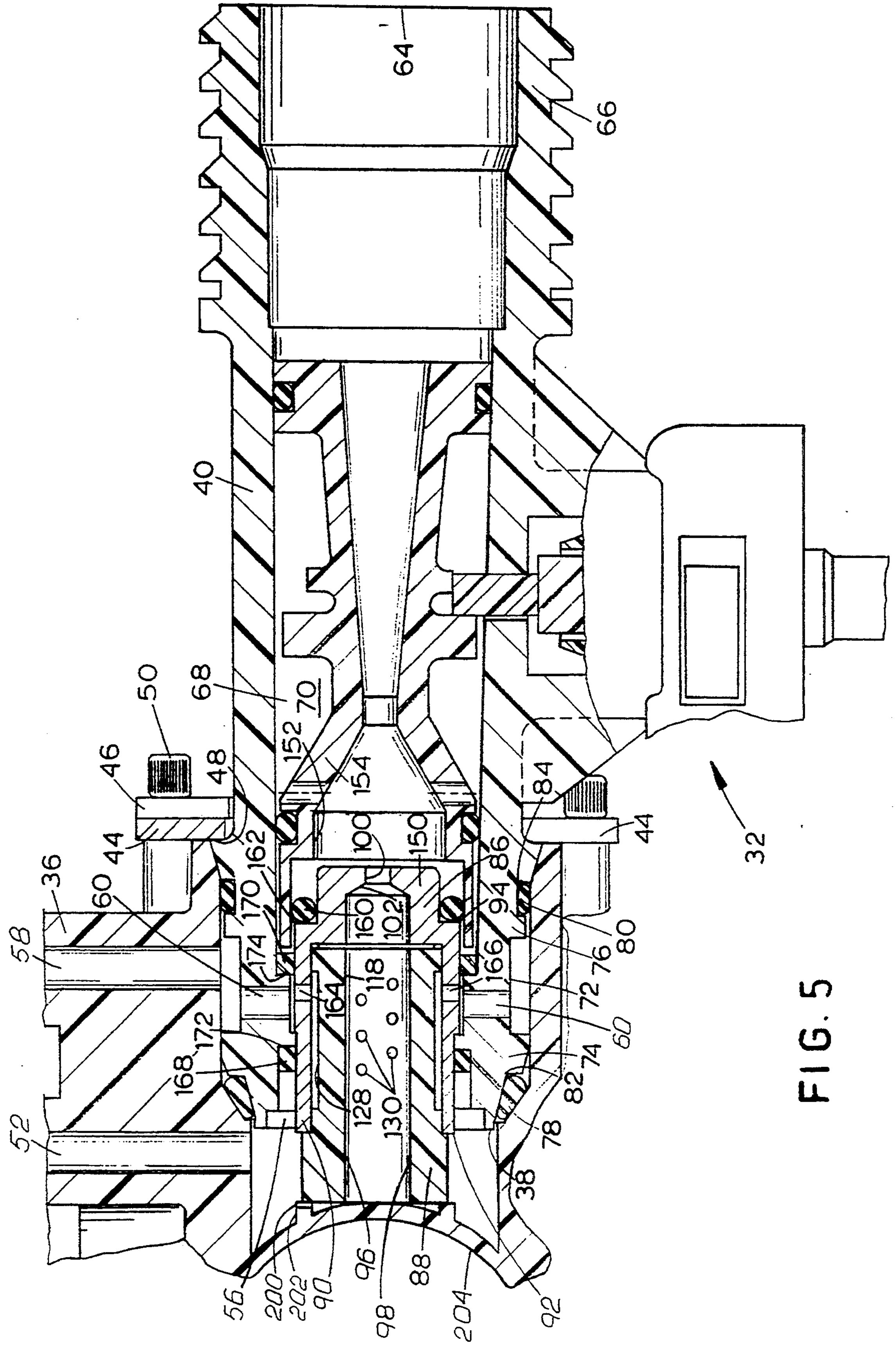
FIG. 5 is an enlarged partial sectional view of the bypass valve of the present invention with the shuttle shown in a second position.

A two-piece retaining plate 42 includes portions 44 and 46 which fit around the valve housing 40 and abut a circumferential retaining flange 48 of the valve housing 40, as seen in FIGS. 4 and 5. Four cap screws 50 and standoffs 51 secure the retaining plate portions 44, 46 to the pump 34. The retaining plate 42 in turn cooperates with the retaining flange 48 to secure the bypass valve 32 in the desired position relative to the pump 34.

A fluid inlet conduit 52 is integral with the pump 34. The conduit 52 provides a fluid communication path from a fluid outlet chamber 54 of the pump 34 to the receiving sleeve 36 and to an inlet port 56 of the valve 32 disposed therein. Further, a fluid bypass conduit 58 is also integral with the pump 34 and provides a second fluid communication path from at least one, and preferably a pair of bypass ports 60 disposed within the valve housing 40, as seen in FIGS. 4 and 5, to a fluid intake chamber 62 in the pump 34.

Referring now to FIGS. 4 and 5, the bypass valve 32 of the present invention is illustrated and described in greater detail. The valve housing 40 has an outlet port 64 at an outlet end 66. The bypass ports 60 are disposed between the inlet end 38 and the outlet end 66 of the valve housing 40.

The inlet port 56, the outlet port 64 and the bypass ports 60 are all in fluid communication with a valve chamber 68 defined in part by an interior surface 70 of the valve housing 40. The bypass ports 60 provide a fluid communication path between the valve chamber 68 and an annular groove 72 that circumferentially surrounds the valve housing 40 near the inlet end 38 thereof. The groove 72 is defined by two circumferential flanges 74, 76 that surround the valve housing 40 on opposite sides of the bypass ports 60.

A pair of circumferential fluid seals 78, 80 are disposed in recesses 82 and 84 and surround the valve housing 40 adjacent the flanges 74, 76 outside of the groove 72. The seal 78 is thus disposed between the flange 74 and the inlet end 38 of the valve housing 40 while the seal 80 is disposed between the flange 76 and the retaining flange 48. The seals 78, 80 and the flanges 74, 76 cooperate with the receiving sleeve 36 to provide sealing engagement between the valve housing 40 and the valve receiving sleeve 36.

A cylindrical shuttle 86, comprising a shuttle body 88 and a shuttle collar 90, is disposed within the valve housing 40 in the valve chamber 68. The shuttle 86 is oriented within the valve housing 40 so that a first end 92 of the shuttle 86, which has a first outer diameter, is disposed toward the inlet end 38 of the valve housing 40, and a second end 94 of the shuttle 86 is disposed toward the outlet end 66 of the valve housing 40.

An axial fluid passage 96 extends through the shuttle 86 and includes a first portion 98 of a first diameter, a second portion 100 of a second, smaller diameter and a tapered portion 102 joining the first and second portions 98, 100.

Figure 6:
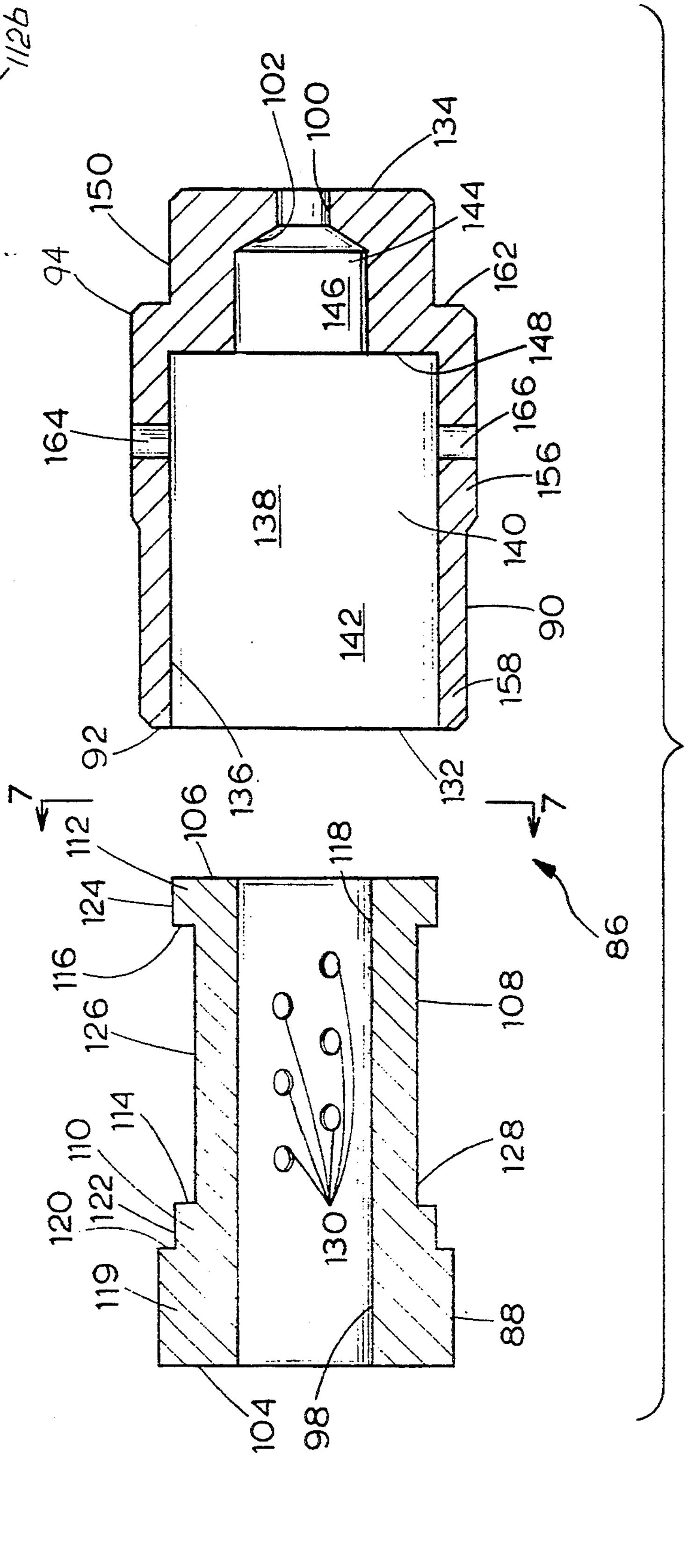
FIG. 6 is an exploded sectional view of the shuttle of the valve of FIGS. 4 and 5.

Referring now to FIG. 6, the shuttle body 88 comprises a cylindrical shell having an inlet end 104, an outlet end 106 and a circumferential outer surface 108. A pair of circumferential shouldered portions 110, 112 project radially outward from the shuttle body 88. The shouldered portion 110 is disposed between the ends 104 and 106 of the shuttle body 88, and the shouldered portion 112 is disposed at the outlet end 106 of the shuttle body 88. Each shouldered portion 110,112 has an inner side wall 114, 116 that is normal to the longitudinal axis of the shuttle body 88. A cylindrical, axial passage 118 extends from the inlet end 104 to the outlet end 106 of the shuttle body 88.

Disposed adjacent to the shouldered portion 110 at the inlet end 104 of the shuttle body 88 and projecting radially outward therefrom is a further shouldered portion 119 having a further side wall 120 normal to the longitudinal axis of the shuttle body 88. The shouldered portions 110, 112 have equal outer diameters of a first size at respective outer surfaces 122,124 of shouldered portions 110,112, and the further shouldered portion 119 has an outer diameter of a second size greater than the first size.

The inner side walls 114,116 of the shouldered portions 110, 112 and a surface 126 together define an annular groove 128 that circumferentially surrounds the shuttle body 88.

A plurality of small apertures 130 extend through the shuttle body 88 between the shouldered portions 110 and 112 to permit fluid communication between the axial fluid passage 96 and the annular groove 128. While not shown, a further plurality of small apertures may be located on the shuttle body 88 at a location diametrically opposite the plurality of apertures 130. Further, while the apertures 130 are shown in staggered locations along shuttle body 88, the apertures 130 may instead be arranged in any other suitable manner.

The shuttle collar 90 has an inlet end 132, an outlet end 134, and an axial passage 136 extending from the inlet end 132 to the outlet end 134 and defined by an interior surface 138. The axial passage 136 through the shuttle collar 90 includes a section 140 bounded by an inner surface 142 and a section 144 bounded by an inner surface 146 and having a diameter substantially equal to that of the axial passage 118 through the shuttle body 88. The axial passage 136 through the shuttle collar 90 further includes the second portion 100 and the tapered portion 102 described above. A side wall 148 of the shuttle collar 90 normal to the longitudinal axis of the shuttle collar 90 joins the inner surface 142 to the inner surface 146.

As seen in FIG. 6, the section 140 of the axial passage 136 through the shuttle collar 90 is cylindrical and has a diameter just large enough to receive the shouldered portions 110 and 112 and to permit the shuttle body 88 and the shuttle collar 90 to be frictionally assembled together where the outer surfaces 122 and 124 of the shouldered portions 110 and 112 meet the inner surface 142 of the shuttle collar 90. Moreover, when the shuttle body 88 and the shuttle collar 90 are fully assembled together, the inlet end 132 of the shuttle collar 90 abuts the further side wall 120 of the further shouldered portion 119 on the shuttle body 88, and the outlet end 106 of the shuttle body 88 is disposed adjacent to or abuts the side wall 148 of the shuttle collar 90.

Figure 7:
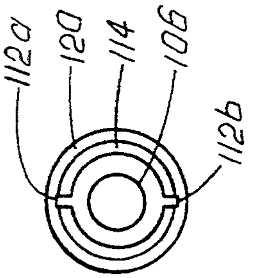
FIG. 7 comprises an end elevational view of the shuttle body, taken generally along the lines 7—7 of FIG. 6.

It should be noted that the shouldered portion 112 need not extend about the entire circumference of the outlet end 106 of the shuttle body 88. For example, as seen in FIG. 7, the shouldered portion 112 may instead comprise two tabs 112*a*, 112*b* disposed on opposite sides of the outlet end 106 wherein the tabs 112*a*, 112*b* are relatively narrow when viewed from the outlet end 106 of the shuttle body 88.

At the outlet end 134, the shuttle collar 90 includes a portion 150 which is reduced in cross-section to enable the outlet end 134 of the shuttle collar 90 to enter into a narrow, cylindrical channel 152 in a venturi tube 154 disposed within the valve housing 40, as seen in FIGS. 4 and 5. The shuttle collar 90 also includes a middle portion 156 having an outer diameter larger than the outer diameter of the reduced cross-section portion 150 and larger than the outer diameter of a portion 158.

Referring again to FIGS. 4 and 5, an O-ring 160 is carried by the shuttle collar 90 and circumferentially surrounds the reduced cross-section portion 150 adjacent to a shoulder 162.

A pair of fluid bypass orifices 164, 166 extend through the middle portion 156 of the shuttle collar 90. When the shuttle body 88 and the shuttle collar 90 are assembled together to form the shuttle 86, the bypass orifices 164, 166 are in fluid communication with the annular groove 128 of the shuttle body 88, which, in turn, is in fluid communication with the axial fluid passage 96 of the shuttle 86 through the apertures 130 in the shuttle body 88.

Referring specifically to FIGS. 4, 4A and 5, a first fluid seal 168 and a second fluid seal 170 are carried by the valve housing 40 abutting radial surfaces 172 and 174 on opposite sides of the bypass ports 60 and provide fluid sealing between the valve housing 40 and the shuttle collar 90. Significantly, the shuttle 86, including the portions 158 and 156 of the shuttle collar 90, remains in sealing and sliding engagement with both the first fluid seal 168 and the second fluid seal 170 as the shuttle 86 moves between first and second positions, as described below.

When the pressure washer 20 is operating and the trigger 30 is depressed with the shuttle 86 in the position shown in FIG. 5, the pump 34 pumps fluid into the receiving sleeve 36 and into the inlet port 56 in the valve housing 40. The fluid then flows through a notch 200 in an annular boss 202 integral with a curved rear wall 204 of the receiving sleeve 36 and through the axial fluid passage 96 in the shuttle 86. The flow of fluid through the tapered portion 102 and the smaller diameter second portion 100 of the axial fluid passage 96 creates a fluid pressure drop across the shuttle 86 such that the pressure acting on the first end 92 of the shuttle 86 is greater than the pressure acting on the second end 94 of the shuttle 86. As a result of this pressure differential, the shuttle 86 is caused to move forward or to the right to a first or forward travel limit position as shown in FIG. 4.

When the shuttle 86 is disposed in the first or forward travel limit position, the bypass orifices 164, 166 of the shuttle 86 are disposed forward of the first and second fluid seals 168, 170 so that fluid communication between the fluid passage 96 in the shuttle 86 and the bypass ports 60 of the valve housing 40 is blocked. Consequently, fluid can only flow through the axial fluid passage 96 in the shuttle 86 and exit the pressure washer 20 through the open spray gun 28.

When the trigger 30 on the spray gun 28 is released, a valve (not shown) downstream of the bypass valve is closed, and hence fluid is prevented from escaping from the spray gun 28. Alternatively, a blockage of the fluid passage downstream of the bypass valve can prevent fluid from escaping from the spray gun 28. As a result, fluid stops flowing or flow is substantially reduced through the axial fluid passage 96 in the shuttle 86, and the pressures acting on opposite ends of the shuttle 86 equalize. When the pressure acting on the first end 92 of the shuttle 86 substantially equals the pressure acting on the second end 94 of the shuttle 86, a net force attributable to the pressures acting on the smaller sealing diameter of the first fluid seal 168 (having the diameter of the portion 158 of the shuttle collar 90) and the relatively larger sealing diameter of the second fluid seal 170 (having the diameter of the middle portion 156 of the shuttle collar 90) urges the shuttle 86 into the second or rearward travel limit position to the left as shown in FIG. 5.

When the shuttle 86 is disposed in the second or rearward travel limit position, the bypass orifices 164, 166 are disposed between the first and second fluid seals 168,170 and permit fluid communication between the axial fluid passage 96 in the shuttle 86 and the bypass ports 60 of the valve housing 40. Specifically, fluid pumped by the pump 34 into the receiving sleeve 36 flows into the inlet port 56 of the valve housing 40 and through the axial fluid passage 96 and the apertures 130 in the shuttle body 88 (to remove particles of debris as described above) into the annular groove 128 between the shuttle body 88 and the shuttle collar 90. From there, the fluid exits through the bypass orifices 164, 166 of the shuttle collar 90 into an annular space defined by the interior surface 70 of the valve housing 40 and the outside surface of the shuttle 86 between the first and second fluid seals 168 and 170. The fluid then escapes from this annular space through the bypass ports 60 in the valve housing 40 and returns to the intake chamber 62 in the pump 34 through the fluid bypass conduit 58 so that the fluid may be recirculated through the pump 34 to avoid potential damage and excessive wear thereof.

During such bypass operation when the shuttle is in the position shown in FIG. 5, the first and second fluid seals 168, 170 remain in sealing contact between the shuttle 86 and the valve housing 40 and a substantial pressure differential is maintained across each seal. The first and second fluid seals 168, 170 are thus frictionally engaged with the shuttle 86 and tend to oppose movement thereof. This frictional engagement, together with the net force developed by the pressure exerted on the shuttle 86 as a whole forcing the shuttle 86 to the left as seen in FIG. 5, positively maintains the shuttle 86 in the second position.

The apertures 130 and the apertures diametrically opposite thereto form a screen in the shuttle body 88 that filters small particles of debris out of the fluid that flows through the valve 32 into the bypass ports 60. Moreover, the bypass orifices 164, 166 have diameters small enough to sufficiently restrict fluid being pumped therethrough by the pump 34 so that the fluid in the valve remains at a substantial pressure (e.g., 700–800 p.s.i.). Alternatively, any other means may be provided for maintaining a substantial pressure within the valve. This fluid pressure maintains a force differential across the shuttle 86 even when partial fluid flow is permitted out of the spray gun 28 so that the shuttle is positively maintained in the second position.

If the trigger 30 on the spray gun 28 is again depressed, fluid flowing through the tapered portion 102 and the smaller diameter second portion 100 of axial fluid passage 96 in the shuttle 86 reinstates the pressure differential across the shuttle 86 and returns the shuttle 86 to the first position as described above. The fluid flowing through the axial fluid passage 96 in the shuttle 86 and exiting the pressure washer 20 through the spray gun 28 washes away any debris filtered out of the fluid by the above-described screen formed by the apertures 130 in the shuttle body 88. In this way, the screen is self-cleaning, obviating the need to periodically disassemble the valve 32 to prevent clogging thereof.

Figure 8:
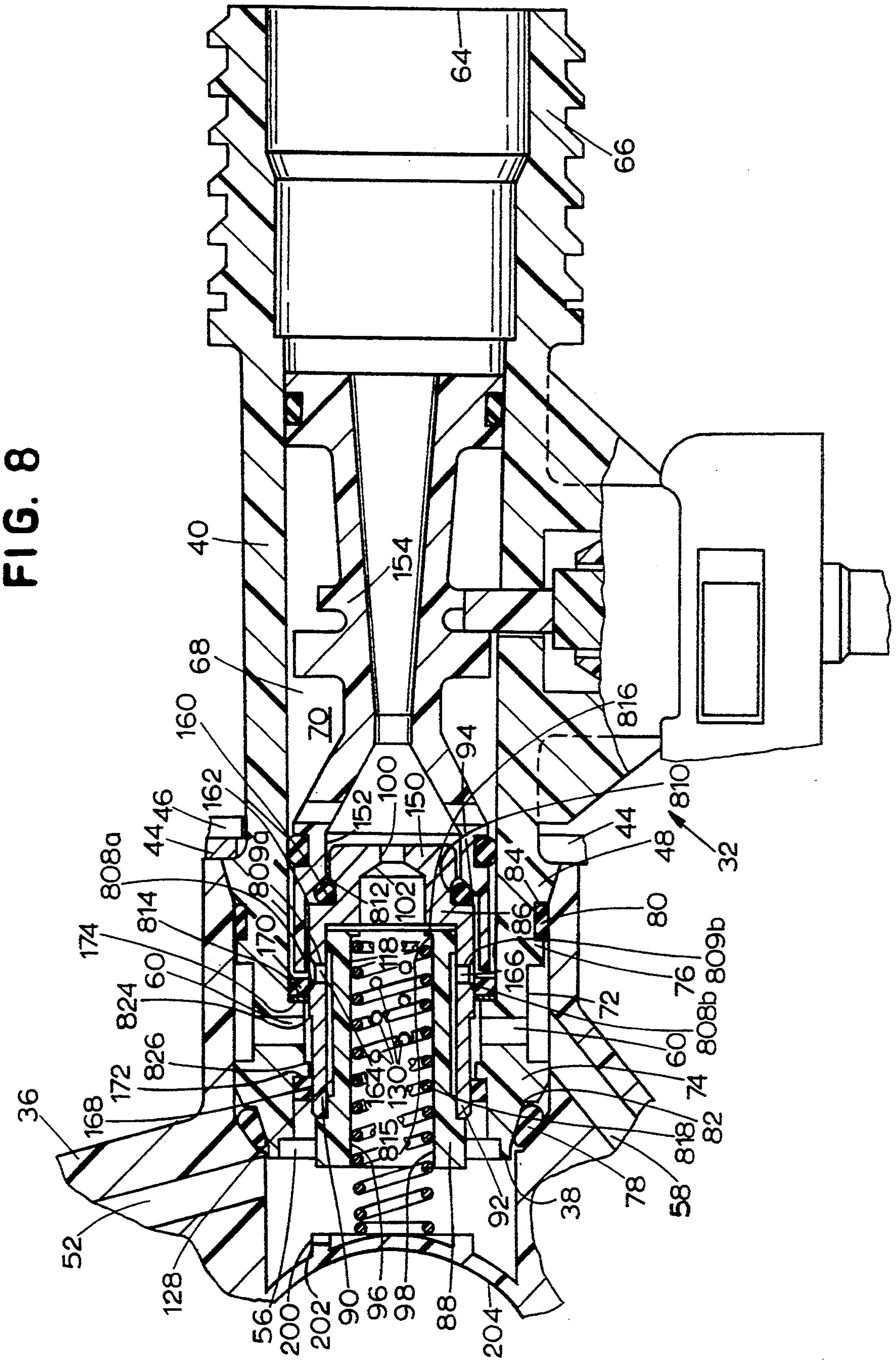
FIG. 8 is a view similar to FIG. 4 of an alternative embodiment of the present invention.
Figure 9:
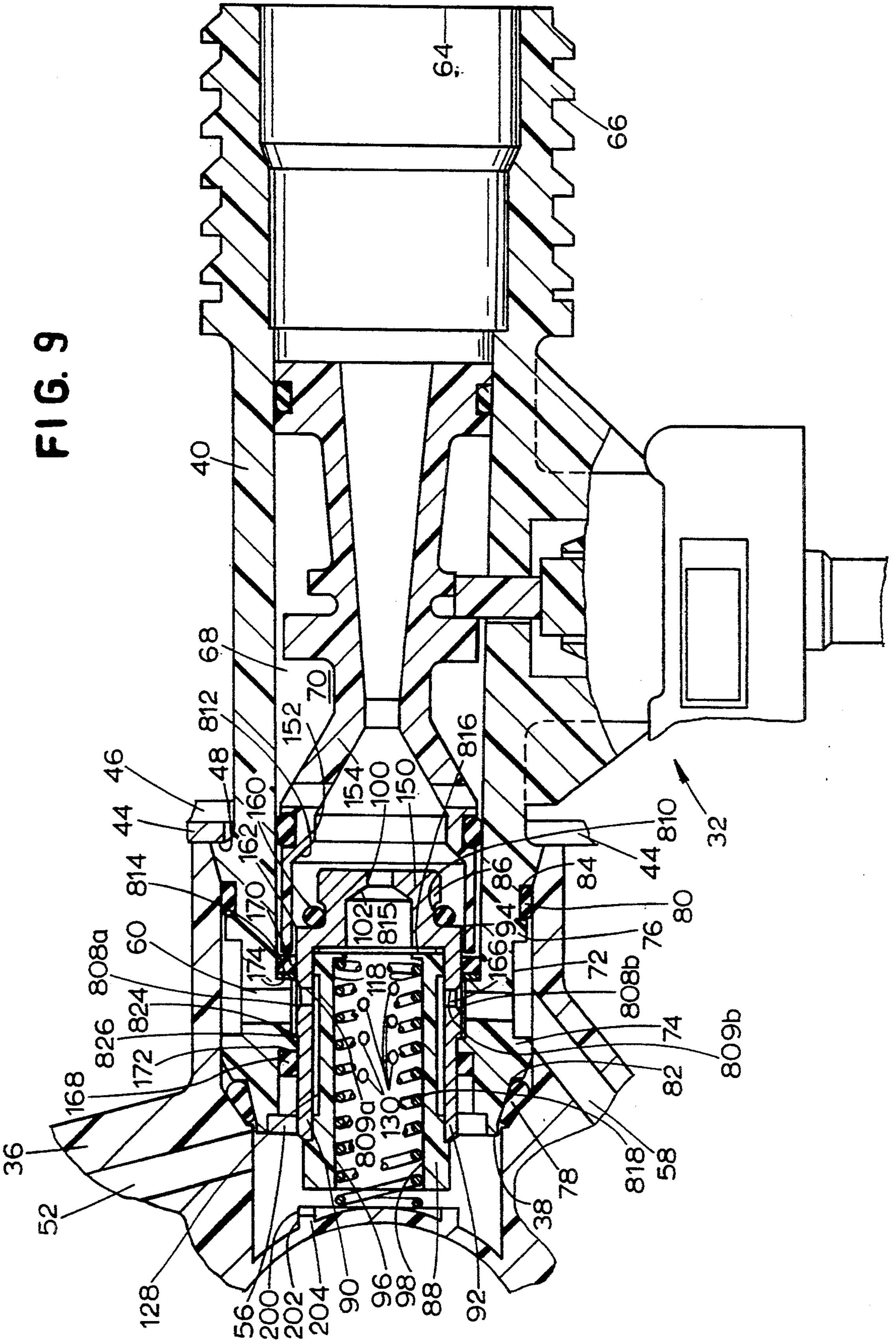
FIG. 9 is a view similar to FIG. 5 of the alternative embodiment of FIG. 8.
Figure 10:
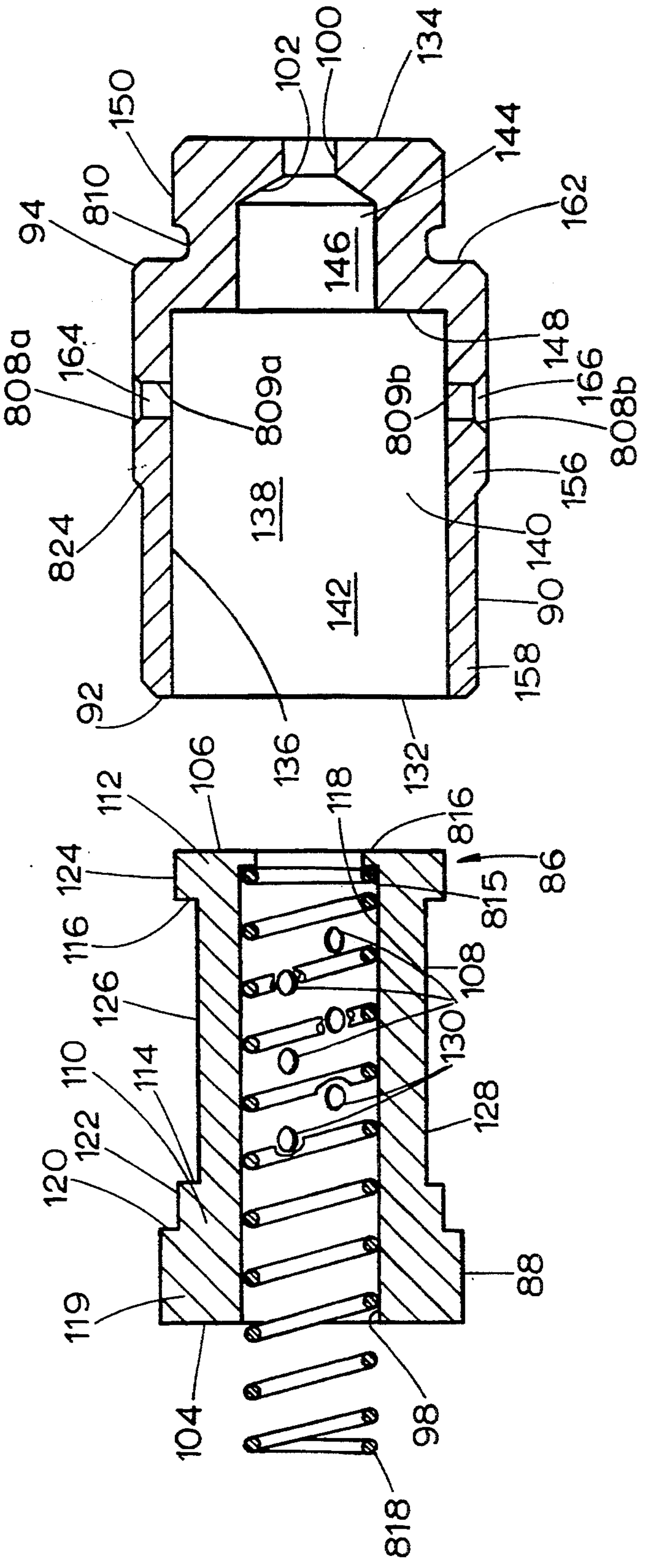
FIG. 10 is a view similar to FIG. 6 of the alternative embodiment of FIGS. 8 and 9.

A second preferred embodiment of the present invention is shown in FIGS. 8–10, wherein elements in common with the embodiment shown in FIGS. 4–7 are given like reference numerals. Only the differences between the two embodiments are described in detail hereinafter.

Referring to FIGS. 8 and 9, in the alternative embodiment of the present invention, a metallic backing ring 814 is disposed between the second fluid seal 170 and the radial surface 174. The backing ring 814 has radial dimensions substantially equal to the radial dimensions of the second fluid seal 170 and prevents extrusion of the second fluid seal 170 into the region between the shuttle collar 90 and the valve housing 40. Without the backing ring 814, seal extrusion could occur due to the radial outward expansion of the valve housing 40 by the high fluid pressure acting on the relatively thin walls of the valve housing 40 at such vicinity.

Referring also to FIG. 10, each bypass orifice, 164, 166 has a tapered portion **808*a*, 808*b*, respectively, disposed at an outside portion or external side and a cylindrical portion 809*a*, 809*b*, respectively, at an inside portion or internal side. The diameter of each tapered portion 808*a*, 808*b* at the widest point thereof at the outer surface of the shuttle collar 90 is greater than the combined thickness (i.e., the left-to-right dimension as seen in FIGS. 8 and 9) of the backing ring 814 and the second fluid seal 170. In addition, the shuttle collar 90 preferably includes an annular groove 810, located at the area of intersection of the reduced cross-section portion 150 and the shoulder 162, which retains the O-ring 160 in position. Still further, a tapered portion 812 is disposed on the venturi tube 154 adjacent to the cylindrical channel 152**.

The shuttle body 88 includes a stepped inner surface 815 defined by a circumferential shoulder 816 disposed adjacent the outlet end 106. A helical compression spring 818 is optionally disposed between the shoulder 816 and the curved rear wall 204 of the receiving sleeve 36 forming an end of the valve chamber 68.

When the pressure washer 20 is operating and the trigger 30 is depressed, the spring 818 (if used) and the pressure differential across the shuttle 86 urge the shuttle 86 toward the forward travel limit position, as shown in FIG. 8. The O-ring 160 engages the tapered portion 812 and prevents fluid from flowing through the bypass orifices 164, 166 into the venturi tube 154.

When the trigger 30 is released, or a blockage occurs downstream of the shuttle 86, the pressure acting on the first end 92 of the shuttle 86 substantially equals the pressure acting on the second end 94 of the shuttle 86. As before, a net force is developed which urges the shuttle 86 toward the second or rearward travel limit position. In this case, the force exerted by the spring 818 (if used) is insufficient to overcome the force developed by the pressure acting on the differing diameter portions of the shuttle 86.

As the shuttle 86 begins to move rearward, the O-ring 160 moves away from the tapered portion 812. As long as the forward edges of the tapered portions **808*a*, 808*b* of the bypass orifices 164, 166 are forward of the second fluid seal 170, fluid passes into the venturi tube 154 through the bypass orifices 164, 166 as well as through the smaller diameter second portion 100 of the axial fluid passage 96. This additional flow path into the venturi tube 154 through the bypass orifices 164,166 further reduces the pressure differential across the shuttle 86 and tends to urge the shuttle 86** to the rearward position.

When the rearward edges of the tapered portions **808*a*, 808*b* just begin to move rearward of the backing ring 814, the tapered portions 808*a*, 808*b* are straddling the backing ring 814 and the second fluid seal 170. At this point, fluid passes through the bypass orifices 164, 166 into the venturi tube 154 and into the bypass ports 60. Once the forward edges of the tapered portions 808*a*, 808*b* are rearward of the forward side of the second fluid seal 170, the entire flow of fluid through each bypass orifice 164, 166 is delivered to the bypass ports 60**.

As should be evident from the foregoing, because of the size of the tapered portions **808*a*, 808*b*, fluid flows through the bypass orifices 164, 166 throughout movement of the shuttle 86 from the forward position to the rearward position. As a result, pressure discontinuities are not encountered due to momentary blockage of the bypass orifices 164, 166. Thus, the transition is smoother than if the tapered portions 808*a*, 808*b* were of a diameter smaller than the combined thickness of the backing ring 814 and the second fluid seal 170. Also, the pressure at which the shuttle 86** is moved from the forward to the rearward positions is fairly constant from valve to valve.

The shuttle collar 90 includes a shouldered portion 824 which engages a shouldered portion 826 on the valve housing 40 when the shuttle 86 is in the rearward position. The length of the further shouldered portion 119 of the shuttle body 88 is reduced so that, when the shouldered portions 824, 826 are in engagement with one another, the inlet end 104 of the shuttle body 88 is spaced from the curved rear wall 204. Thus, fluid can quickly flow into the shuttle body 88 when the trigger 30 is subsequently depressed.

When the pump 34 is switched off and the pressure in the valve housing 40 drops to a low level, the force urging the shuttle toward the second travel limit position also drops. Eventually, the force exerted by the spring 818 overcomes the net force developed by the fluid pressure and the spring 818 parks the shuttle in the forward position. Thus, when the pump 34 is off, backflow of cleaning solution into the pump 34 is minimized.

In addition, the spring rate of the spring 818 may be selected in order to determine the fluid pressure at which the shuttle 86 moves from the rearward to the forward positions.

In the second preferred embodiment, the fluid inlet conduit 52 and the fluid bypass conduit 58 are located on opposing sides of the valve chamber 68 and intersect with the valve chamber 68 obliquely, as seen in FIGS. 8 and 9.

It should be noted that any or all of the features of FIGS. 8–10 may be incorporated into the embodiment of FIGS. 4–7. Thus, for example, any or all of the backing ring 814, the tapered portions 808*a*, 808*b*, the annular groove 810, the tapered portion 812, the stepped inner surface 815, the spring 818 and the shouldered portions 824, 826 may be added to the embodiment of FIGS. 4–7.

In connection with either embodiment described above, it should be noted that although each shuttle is described as including a shuttle body and a separate shuttle collar, the present invention may be practiced using a one-piece or unitary shuttle, if desired.

Further, while the valve housing and the shuttle body preferably are composed of a durable plastic material and the shuttle collar preferably is composed of metal, these parts may be composed of any other suitable material, as desired.

Although the present invention is described in the context of a floor-standing pressure washer, it should be noted that the present invention is capable of use in other applications, such as the hand-held pressure washer described above.

The foregoing description is for the purpose of teaching those skilled in the art the best mode of carrying out the invention and is to be construed as illustrative only. Numerous modifications and alternative embodiments of the invention will be apparent to those skilled in the art in view of this description. The details of the disclosed structure may be varied substantially without departing from the spirit of the invention, and the exclusive use of all modifications within the scope of the appended claims is reserved.

We claim:

1. In a fluid bypass valve including
a valve housing having
a valve chamber therein,
an inlet port disposed at an inlet end of the valve chamber,
an outlet port disposed at an outlet end of the valve chamber, and
a bypass port disposed between the inlet end and the outlet end, wherein the inlet port, outlet port, and bypass port are in fluid communication with the valve chamber, and
a shuttle having a fluid passage therein and disposed within the valve chamber and movable between a first travel limit position wherein fluid communication between the fluid passage and the bypass port is blocked and a second travel limit position wherein the fluid passage is in fluid communication with the bypass port, the improvement comprising:
first and second fluid seals carried by interior surfaces of the valve housing on opposite sides of the bypass port; and
surfaces on the shuttle disposed in sealing and sliding engagement with both the first and second fluid seals when the shuttle is in the first and second travel limit positions;
wherein the inlet port and the outlet port are in fluid communication through the fluid passage when the shuttle is in the first and second travel limit positions.

2. The improvement of claim 1, wherein the shuttle further includes a bypass orifice for permitting escape of fluid from the fluid passage to the bypass port when the shuttle is in the second travel limit position.

3. The improvement of claim 1, wherein the fluid passage includes a portion of reduced cross-sectional size which produces a pressure drop across the shuttle as fluid flows through the fluid passage.

4. The improvement of claim 1, wherein the second fluid seal abuts a metal backing ring which prevents extrusion of the second fluid seal.

5. The improvement of claim 1, further including a spring placed in compression between an end wall of the valve chamber and the shuttle.

6. The improvement of claim 1, wherein the shuttle further includes a first sealing surface having a first cross-sectional area and a second sealing surface having a second, larger cross-sectional area.

7. The improvement of claim 6, wherein the pressure at the inlet end of the valve chamber exceeds the pressure at the outlet end of the valve chamber and urges the shuttle into the first travel limit position when fluid is permitted to escape from the valve chamber through the outlet port and wherein the pressure at the inlet end substantially equals the pressure at the outlet end when escape of fluid from the valve chamber through the outlet port is substantially reduced so that a net force attributable to the pressures acting on the first and second cross-sectional areas being sealed by the first and second seals urges the shuttle into the second travel limit position.

8. In a fluid bypass valve including
a valve housing having
a valve chamber therein,
an inlet port disposed at an inlet end of the valve chamber,
an outlet port disposed at an outlet end of the valve chamber, and
a bypass port disposed between the inlet end and the outlet end, wherein the inlet port, outlet port, and bypass port are in fluid communication with the valve chamber, and
a shuttle having a fluid passage therein and disposed within the valve chamber and movable between a first travel limit position wherein fluid communication between the fluid passage and the bypass port is blocked and a second travel limit position wherein the fluid passage is in fluid communication with the bypass port, the improvement comprising:
first and second fluid seals carried by interior surfaces of the valve housing on opposite sides of the bypass port;
surfaces on the shuttle disposed in sealing and sliding engagement with both the first and second fluid seals when the shuttle is in the first and second travel limit positions;
wherein the inlet port and the outlet port are in fluid communication through the fluid passage when the shuttle is in the first and second travel limit positions;
wherein the shuttle further includes a bypass orifice for permitting escape of fluid from the fluid passage to the bypass port when the shuttle is in the second travel limit position; and
wherein the bypass orifice travels past the first fluid seal as the shuttle moves between the first and second travel limit positions and wherein the bypass orifice has a cross-sectional size at an outer portion thereof which is larger than a cross-sectional size of the first fluid seal.

9. The improvement of claim 8, wherein the bypass orifice includes a cylindrical portion at an inner portion thereof and a tapered portion at the outer portion thereof.

10. In a fluid bypass valve including
a valve housing having
a valve chamber therein,
an inlet port disposed at an inlet end of the valve chamber,
an outlet port disposed at an outlet end of the valve chamber, and
a bypass pore disposed between the inlet end and the outlet end, wherein the inlet port, outlet port, and bypass port are in fluid communication with the valve chamber, and
a shuttle having a fluid passage therein and disposed within the valve chamber and movable between a first travel limit position wherein fluid communication between the fluid passage and the bypass port is blocked and a second travel limit position wherein the fluid passage is in fluid communication with the bypass port, the improvement comprising:
first and second fluid seals carried by interior surfaces of the valve housing on opposite sides of the bypass port;
surfaces on the shuttle disposed in sealing and sliding engagement with both the first and second fluid seals when the shuttle is in the first and second travel limit positions;
wherein the inlet port and the outlet port are in fluid communication through the fluid passage when the shuttle is in the first and second travel limit positions;
wherein the shuttle further includes a bypass orifice for permitting escape of fluid from the fluid passage to the bypass port when the shuttle is in the second travel limit position; and
wherein the bypass orifice is disposed between an end of the valve chamber and the first and second fluid seals when the shuttle is in the first travel limit position and wherein the orifice is disposed between the first and second fluid seals when the shuttle is in the second travel limit position.

11. In a fluid bypass valve including
a valve housing having
a valve chamber therein,
an inlet port disposed at an inlet end of the valve chamber,
an outlet port disposed at an outlet end of the valve chamber, and
a bypass port disposed between the inlet end and the outlet end, wherein the inlet port, outlet port, and bypass port are in fluid communication with the valve chamber, and
a shuttle having a fluid passage therein and disposed within the valve chamber and movable between a first travel limit position wherein fluid communication between the fluid passage and the bypass port is blocked and a second travel limit position wherein the fluid passage is in fluid communication with the bypass port, the improvement comprising:
first and second fluid seals carried by interior surfaces of the valve housing on opposite sides of the bypass port;
surfaces on the shuttle disposed in sealing and sliding engagement with both the first and second fluid seals when the shuttle is in the first and second travel limit positions;
wherein the inlet port and the outlet port are in fluid communication through the fluid passage when the shuttle is in the first and second travel limit positions; and
wherein the shuttle includes a first shouldered portion which engages a second shouldered portion on the valve housing when the shuttle is in the second travel limit position such that an end of the shuttle is spaced from a rear wall of the valve chamber.

12. In a fluid bypass valve including
a valve housing having
a valve chamber therein,
an inlet port disposed at an inlet end of the valve chamber,
an outlet port disposed at an outlet end of the valve chamber, and
a bypass port disposed between the inlet end and the outlet end, wherein the inlet port, outlet port, and bypass port are in fluid communication with the valve chamber, and
a shuttle having a fluid passage therein and disposed within the valve chamber and movable between a first travel limit position wherein fluid communication between the fluid passage and the bypass port is blocked and a second travel limit position wherein the fluid passage is in fluid communication with the bypass port, the improvement comprising:
first and second fluid seals carried by interior surfaces of the valve housing on opposite sides of the bypass port;
surfaces on the shuttle disposed in sealing and sliding engagement with both the first and second fluid seals when the shuttle is in the first and second travel limit positions;
wherein the inlet port and the outlet port are in fluid communication through the fluid passage when the shuttle is in the first and second travel limit positions; and
wherein the shuttle includes a cylindrical shuttle body portion having the fluid passage therein and a hollow cylindrical shuttle collar that circumferentially surrounds the shuttle body portion.

13. The improvement of claim 12, wherein the shuttle collar includes a bypass orifice and the shuttle body portion includes a series of apertures therethrough forming a screen in fluid communication with the bypass orifice.

14. The improvement of claim 12, wherein the pressure acting on the first and second cross-sectional areas cause the fluid seals to frictionally engage the shuttle and thereby substantially resist movement thereof.

15. In a fluid bypass valve including
a valve housing having
a valve chamber therein,
an inlet port disposed at an inlet end of the valve chamber,
an outlet port disposed at an outlet end of the valve chamber, and
a bypass port disposed between the inlet end and the outlet end, wherein the inlet port, outlet port, and bypass port are in fluid communication with the valve chamber, and
a shuttle having a fluid passage therein and disposed within the valve chamber and movable between a first position wherein fluid communication between the fluid passage and the bypass port is blocked and a second position wherein the fluid passage is in fluid communication with the bypass port, the improvement comprising:

first and second fluid seals carried by interior surfaces of the valve housing on opposite sides of the bypass port;

wherein the shuttle further includes a first sealing surface having a first cross-sectional area, a second sealing surface having a second, larger cross-sectional area, the first and second sealing surfaces being disposed in sealing and sliding engagement with both the first and second fluid seals when the shuttle is in the first and second positions, a cylindrical shuttle body portion having the fluid passage therein and a hollow cylindrical shuttle collar that circumferentially surrounds the shuttle body portion;

wherein the pressure at the inlet end of the valve chamber exceeds the pressure at the outlet end of the valve chamber and urges the shuttle into the first position when fluid is permitted to escape from the valve chamber through the outlet port and wherein the pressure at the inlet end substantially equals the pressure at the outlet end when escape of fluid from the valve chamber through the outlet port is substantially reduced so that a net force attributable to the pressures acting on the first and second cross-sectional areas being sealed by the first and second fluid seals urges the shuttle into the second position; and wherein the shuttle collar includes a bypass orifice therein and the shuttle body portion further includes a series of apertures therethrough forming a screen in fluid communication with the bypass orifice that prevents debris in fluid flowing through the valve from clogging the bypass orifice, the bypass orifice cooperating with the screen to permit fluid to escape from the fluid passage to the bypass port when the shuttle is in the second position.

16. The improvement of claim 15, wherein the pressures acting on the first and second cross-sectional areas cause said seals to frictionally engage the shuttle and thereby substantially resist movement thereof.

17. The improvement of claim 16, wherein the bypass orifice travels past the first fluid seal as the shuttle moves between the first and second positions and wherein the bypass orifice has a cross-sectional size at an outer portion thereof which is larger than a width of the first fluid seal.

18. The improvement of claim 17, wherein the bypass orifice includes a cylindrical portion at an inner portion thereof and a tapered portion at the outer portion thereof.

19. The improvement of claim 18, wherein the bypass orifice is disposed between an end of the valve chamber and the first and second fluid seals when the shuttle is in the first position and wherein the orifice is disposed between the first and second fluid seals when the shuttle is in the second position.

20. The improvement of claim 19, wherein the fluid passage includes a portion of reduced cross-sectional size which produces a pressure drop across the shuttle as fluid flows through the fluid passage.

21. The improvement of claim 15, wherein the second fluid seal abuts a metal backing ring which prevents extrusion of the second fluid seal.

22. The improvement of claim 15, wherein the shuttle includes a first shouldered portion which engages a second shouldered portion on the valve housing when the shuttle is in the second travel limit position such that an end of the shuttle is spaced from a rear wall of the valve chamber.

23. The improvement of claim 15, further including a spring placed in compression between an end wall of the valve chamber and the shuttle.

* * * * *